No. 681,687. Patented Sept. 3, 1901.
S. EDSALL.
FISHING ROD AND REEL COMBINED.
(Application filed Apr. 17, 1900.)

(No Model.)

WITNESSES:

INVENTOR

ATTORNEY

UNITED STATES PATENT OFFICE.

SEELY EDSALL, OF PLAINFIELD, NEW JERSEY.

FISHING ROD AND REEL COMBINED.

SPECIFICATION forming part of Letters Patent No. 681,687, dated September 3, 1901.

Application filed April 17, 1900. Serial No. 13,206. (No model.)

*To all whom it may concern:*

Be it known that I, SEELY EDSALL, a citizen of the United States, residing at Plainfield, Union county, State of New Jersey, have invented certain Improvements in a Combined Fish Rod and Reel, of which the following is a specification.

My invention relates to the manner of combining the reel and rod so as to make the said reel, with its frame, a part of the supporting structure and to do so in a manner to gain advantage in the manipulation of the said rod and reel, as will be hereinafter set forth.

Figure 1:
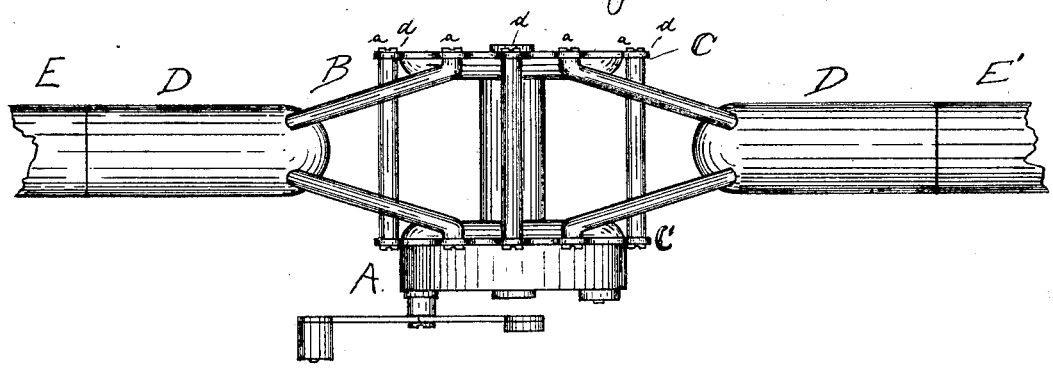
Figure 2:
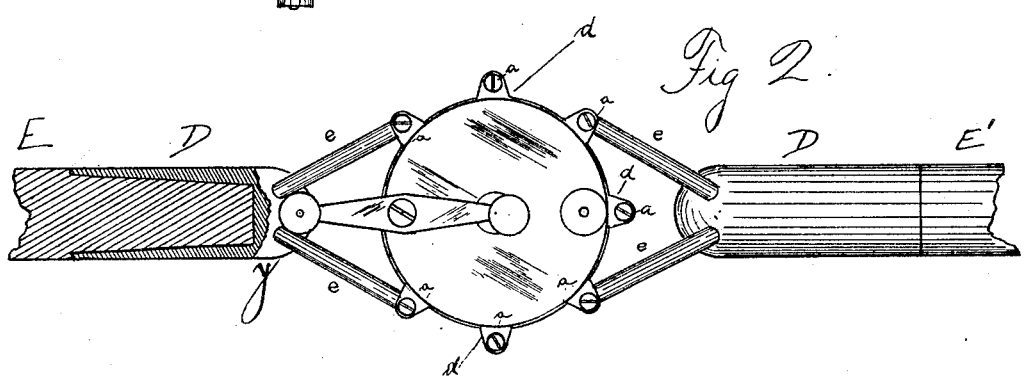

In the accompanying drawings, Figure 1 shows a combined rod and reel arranged according to my invention in a plan view. Fig. 2 is a view of the same in elevation.

A represents a reel of well-known construction having the framework B, which comprises the plates C C, having the sockets D D secured thereto, preferably by the metal arms $e\ e\ e\ e$, and with the sections E E' of the fish-pole secured in the said sockets, in any of the well-known ways of securing poles in sockets, the only additions to the combined reel and rod being the arms $e\ e\ e\ e$ for securing the reel-frame to the devices for supporting the sections of the rod, which devices may be the sockets shown or simply ferrules joined to the said arms $e\ e\ e\ e$ by soldering or otherwise. By this arrangement the reel-frame becomes a part of the supporting structure, the section E of the pole being in such relation to the said frame as to support the frame and the said frame being in such relation to the section E' as to support the said section of the pole and the attached sections thereof. The great advantage of this manner of construction is that the pole is evenly balanced, and there is no tendency to turn when the reel is being wound, and the open spaces formed by the arms $e\ e\ e\ e$ add to the appearance of the structure and admit of readily steadying the pole by the placing of the thumb upon an arm $e$, while the opportunity for correcting any unevenness in the winding of the line upon the reel is at hand by the open structure that admits of introducing the finger in and to the reel itself to guide the said line. The sockets D D have a solid end $y$, into which the arms $e\ e$ are secured by being screwed, the said arms being secured to the plates C C by a screw passing through said plates to each of said arms at $a$, thus making a structure which while light in weight and attractive in appearance is strong and can be kept clean and be made to have a more attractive appearance by being plated with nickel or other like desired plating.

Any of the well-known fish-rods can be employed in combination with this construction of combined rod and reel, and various fish-lines can be used with a single rod thus constructed.

What I claim is—

1. A combined reel and rod comprising arms $e, e, e, e$, secured to the said reel by screws, and joined to supporting-sockets that are adapted to support sections of a pole, substantially as described.

2. The combination of a reel and rod that comprises metal arms $e, e, e, e$, consisting of short rods of metal, and which are removably secured to the frame of a reel and to the supporting devices or sockets, substantially as described.

SEELY EDSALL.

Witnesses:
A. C. BUELL,
CHAS. E. BUELL.